United States Patent
Nakamura et al.

(10) Patent No.: US 8,091,676 B2
(45) Date of Patent: Jan. 10, 2012

(54) ARRANGEMENT STRUCTURE OF AUXILIARIES OF ENGINE FOR SNOW VEHICLE

(75) Inventors: Hideto Nakamura, Shizuoka (JP); Toshio Hayashi, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 620 days.

(21) Appl. No.: 12/175,656

(22) Filed: Jul. 18, 2008

(65) Prior Publication Data

US 2009/0026000 A1    Jan. 29, 2009

(30) Foreign Application Priority Data

Jul. 26, 2007  (JP) ................. 2007-194089

(51) Int. Cl.
    *B60K 5/00*    (2006.01)
(52) U.S. Cl. .............. 180/291; 180/186; 123/195 R
(58) Field of Classification Search .......... 180/186, 180/182, 190, 291, 297, 292; 123/193.3, 123/195 A, 195 C, 195 R, 196 R
    See application file for complete search history.

(56) References Cited

U.S. PATENT DOCUMENTS

| | | | |
|---|---|---|---|
| 6,725,958 B2 * | 4/2004 | Ashida et al. ............... | 180/186 |
| 6,923,287 B2 * | 8/2005 | Morii ............................ | 180/292 |
| 7,089,904 B2 | 8/2006 | Morii et al. | |
| 7,093,569 B2 * | 8/2006 | Nakatsuka et al. ......... | 123/41.44 |
| 7,104,355 B2 * | 9/2006 | Hoi ............................... | 180/291 |
| 7,147,077 B2 * | 12/2006 | Morii et al. .................. | 180/291 |
| 2002/0081918 A1 | 6/2002 | Mineno et al. | |
| 2003/0019464 A1 | 1/2003 | Morii et al. | |
| 2003/0062209 A1 | 4/2003 | Iyoda et al. | |
| 2003/0118260 A1 | 6/2003 | Suzuki | |
| 2004/0118370 A1 | 6/2004 | Ohsawa | |
| 2004/0250789 A1 | 12/2004 | Morii et al. | |

FOREIGN PATENT DOCUMENTS

| | | |
|---|---|---|
| JP | 61-17204 | 5/1986 |
| JP | 2003-41921 | 2/2003 |
| JP | 2005-2940 | 1/2005 |

OTHER PUBLICATIONS

English language Abstract of JP 2003-41921, Feb. 13, 2003.
English language Abstract of JP 2005-2940, Jan. 6, 2005.
U.S. Appl. No. 12/176,627 to Nakamura et al., which was filed Jul. 21, 2008.

* cited by examiner

*Primary Examiner* — John Walters
(74) *Attorney, Agent, or Firm* — Stein McEwen, LLP

(57) ABSTRACT

An engine for a snow vehicle has a crank shaft supported by a crank case along the width direction of the snow vehicle. An oil pan is disposed below the crank case. A cylinder block is disposed above the crank case. The engine is mounted on the snow vehicle such that an axis of the cylinder block is inclined rearward. An oil pump is disposed behind and below the crank shaft. An oil filter is disposed in front of the crank shaft.

8 Claims, 6 Drawing Sheets

ARRANGEMENT STRUCTURE OF AUXILIARIES OF ENGINE FOR SNOW VEHICLE

This application claims priority from Japanese Patent Application No. 2007-194089 filed Jul. 26, 2007, the entire contents of which are herein incorporated by reference.

BACKGROUND

The present invention relates to an arrangement structure of auxiliaries of an engine for a snow vehicle, such as a snow mobile.

Generally, in a front part of a vehicle body of a snow vehicle, such as a snow mobile, an engine is mounted in an engine room covered with an engine mount frame. In this engine, auxiliaries, such as an oil pump, an oil filter, and oil piping for supplying lubricating oil to respective parts of the engine, and a water pump and cooling water piping for supplying water to the engine, are arranged.

In an example of a related-art arrangement structure of auxiliaries of an engine for a snow vehicle, an exhaust manifold is arranged in a front upper part of an engine body, and an oil filter is disposed below the exhaust manifold so as to incline slightly forward in a vehicle traveling direction (refer to Patent Document 1). In another example, a supplying oil pump for supplying lubricating oil and a recovering oil pump for recovering the lubricating oil are arranged between a crank case and a magnet cover (refer to Patent Document 2). In still another example, a branch passage that leads to a relief valve disposed in an oil pan is provided in the middle of an oil passage communicating with an oil filter from an oil pump (refer to Patent Document 3).

Patent Document 1: Japanese Patent Publication No. 2003-41921 A
Patent Document 2: Japanese Patent Publication No. 2005-2940 A
Patent Document 3: Japanese Utility Model Publication No. 61-17204 A However, in the related-art arrangement structures of the auxiliaries disclosed in the Patent Document 1, since the exhausted manifold, a water pump, and the like are arranged around the oil filter, it is difficult to create a sufficient maintenance space around the oil filter. Accordingly, it is difficult to perform replacement work of the oil filter.

In the related-art arrangement structure of the auxiliaries disclosed in the Patent Document 2, since a water pump is arranged in front of and above the crank shaft, the distance between the water pump and a heat exchanger arranged behind and below the engine becomes long, and consequently, the length of cooling water piping becomes large. For this reason, it is difficult to make an engine compact and light, and it is difficult to improve cooling efficiency.

Moreover, in this related-art arrangement structure of the auxiliaries, since the oil pump is arranged in front of and above the crank shaft, the distance between the oil pump and the lubricating oil within an oil pan arranged in a lower part of the engine becomes long, and consequently, an oil strainer becomes long, then the suction stroke of the lubricating oil extends. For this reason, it is difficult to increase the pumping efficiency of the lubricating oil. Therefore, an initial lubrication of the engine at the time of start of the engine might be delayed.

Furthermore, in the related-art arrangement structure of the auxiliaries disclosed in the Patent Document 3, an oil passage includes a vertical portion that is directed downward from a discharge port of an oil pump, a horizontal portion that connects lower end of vertical portion to the oil filter, and a branch passage that connects the middle of the horizontal portion to a lower oil pan. Accordingly, it is necessary to block the lower end of the vertical portion with a plug, or to provide an oil relief attaching seat with the branch portion. For this reason, it is necessary to take much time and cost for manufacturing the oil passage, and it is difficult to make the engine compact.

Moreover, in this related-art arrangement structure of the auxiliaries, the surplus oil from the oil pump drops to the horizontal portion of the oil passage. Therefore, bubbles are generated due to the dropped oil, and the surplus oil cannot be surely returned to the oil pump.

SUMMARY

It is therefore an object of the invention to provide an arrangement structure of auxiliaries of an engine for a snow vehicle, capable of easily performing replacement work of an oil filter, making the engine compact and light, improving efficiency of operation of the auxiliaries, and easily manufacturing an oil passage easily.

According to an aspect of an exemplary embodiment of the present invention, there is provided an arrangement structure of auxiliaries of an engine for a snow vehicle, the engine having a crank shaft supported by a crank case along the width direction of the snow vehicle, an oil pan disposed below the crank case, and a cylinder block disposed above the crank case, and the engine mounted on the snow vehicle such that an axis of the cylinder block is inclined rearward, wherein an oil pump is disposed behind and below the crank shaft; and wherein an oil filter is disposed in front of the crank shaft.

An starter motor may be provided behind the cylinder block; and the oil pump may be disposed in front of an tangent line of the starter motor, which is parallel to the axis of the cylinder block, when seen from the lateral side of the engine.

A water pump may be disposed coaxially with a drive shaft of the oil pump.

A first oil passage may be provided to communicate a discharge port of the oil pump with the oil pan; a second oil passage may be provided to communicate the oil filter with the middle of the first oil passage; and an oil relief valve may be provided at an opening end of the first oil passage on the side of the oil pan.

According to another aspect of an exemplary embodiment of the present invention, there is also provided an engine which is configured to be mounted on a vehicle, the engine comprising: a crank shaft extending in the width direction of the vehicle; a crank case supporting the crank shaft; a cylinder block disposed above the crank case; an oil pan disposed below the crank case; an oil pump disposed behind and below the crank shaft; and an oil filter disposed in front of the crank shaft; wherein the engine is mounted on the vehicle such that an axis of the cylinder block is included rearward.

With the above configuration, since the oil pump is provided behind and below the crank shaft, and the oil filter is provided in front of the crank shaft, the replacement work of the oil filter can be performed easily, and maintenance performance can be improved.

Further, by arranging the oil pump behind and below the crank shaft, the distance from the oil pan becomes short. Accordingly, the suction stroke of lubricating oil becomes short. As a result, the pumping efficiency of lubricating oil can be enhanced.

Moreover, by arranging the oil pump in front of the tangent line, it is possible to make the engine compact, and handling of the vehicle can be improved.

Furthermore, by providing the water pump coaxially with the drive shaft of the oil pump, the length of cooling water piping between the water pump and the heat exchanger can be shortened. Therefore, it is possible to make the engine compact and light. Further, cooling efficiency can be improved.

Moreover, by providing the oil relief valve at the opening end of the first oil passage on the side of the oil pan, the oil passages can be simply manufactured, and the downsizing of the engine can be achieved. Further, since the surplus oil from the oil pump is directly returned to the oil pan, it is possible to ensure that the surplus oil is returned to the oil pump.

BRIEF DESCRIPTION OF THE DRAWINGS

The above and other aspects of the present invention will become more apparent by describing in detail exemplary embodiments thereof with reference to the accompanying drawings, wherein.

DETAILED DESCRIPTION OF EXEMPLARY EMBODIMENTS

Hereinafter, an embodiment of the invention will be explained with reference to the drawings.

Figure 1:
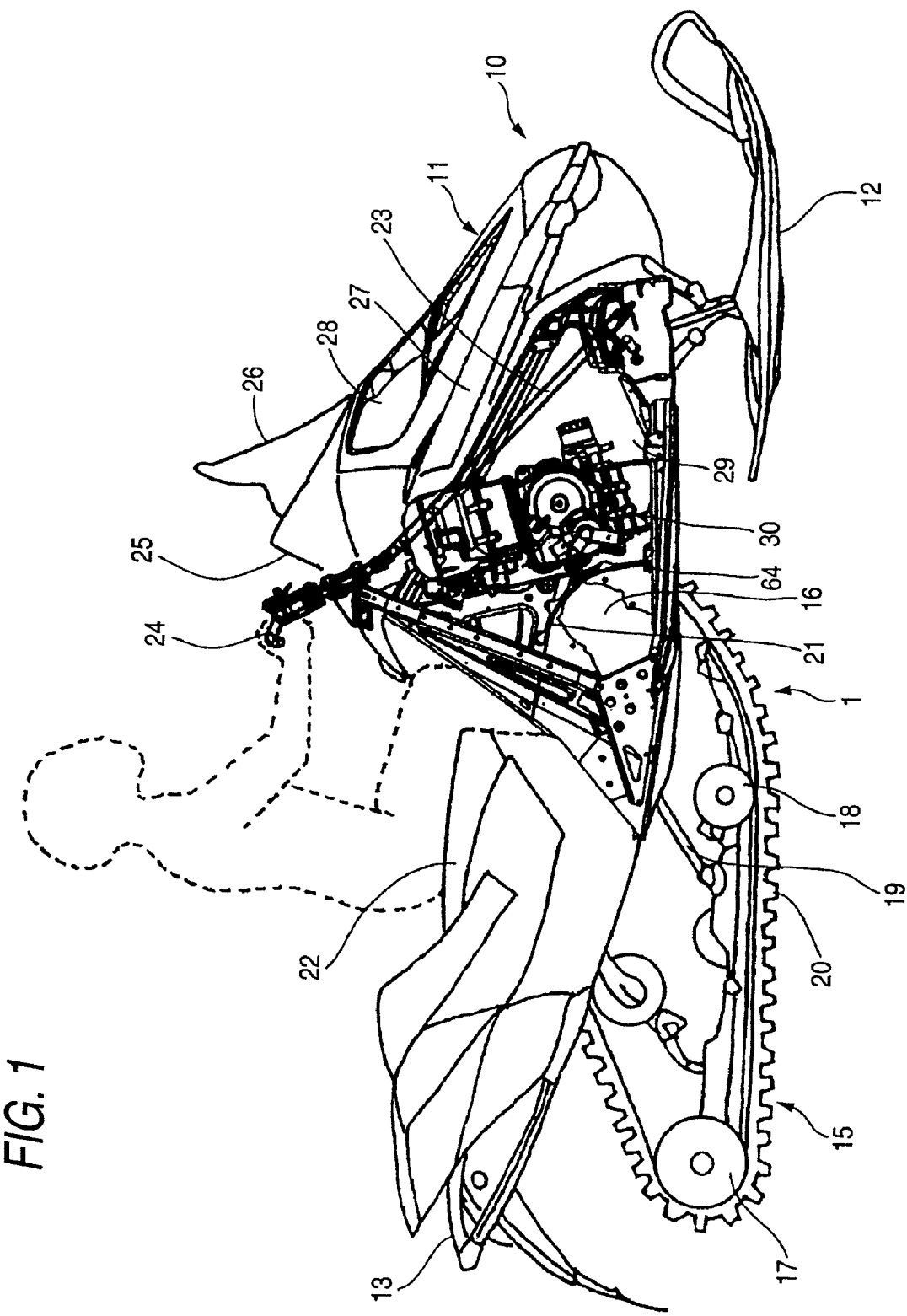
FIG. 1 is a side view showing a snow vehicle on which an engine of an embodiment of the invention is mounted.
Figure 2:
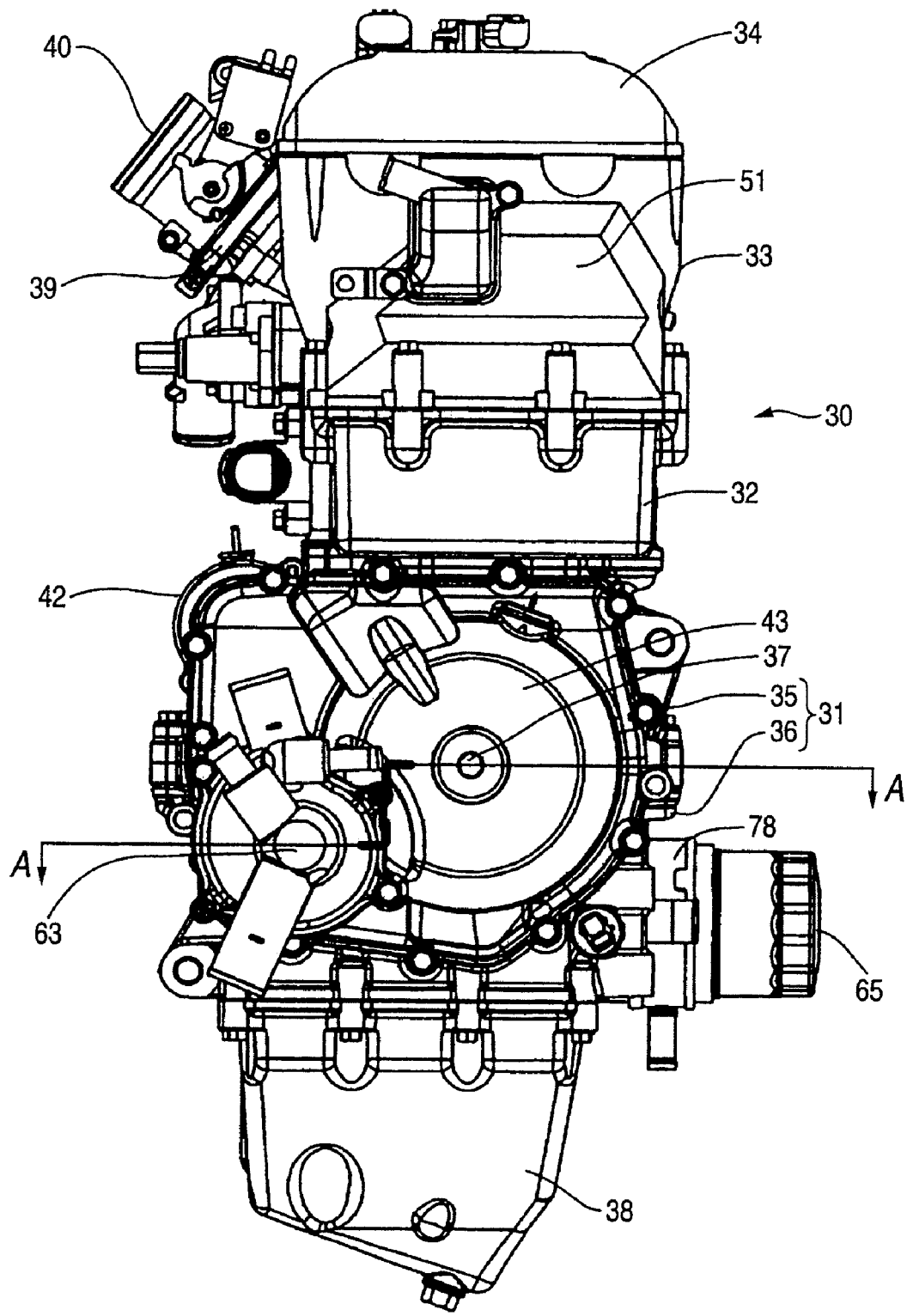
FIG. 2 is a side view showing the engine of the embodiment of the invention.
Figure 3:
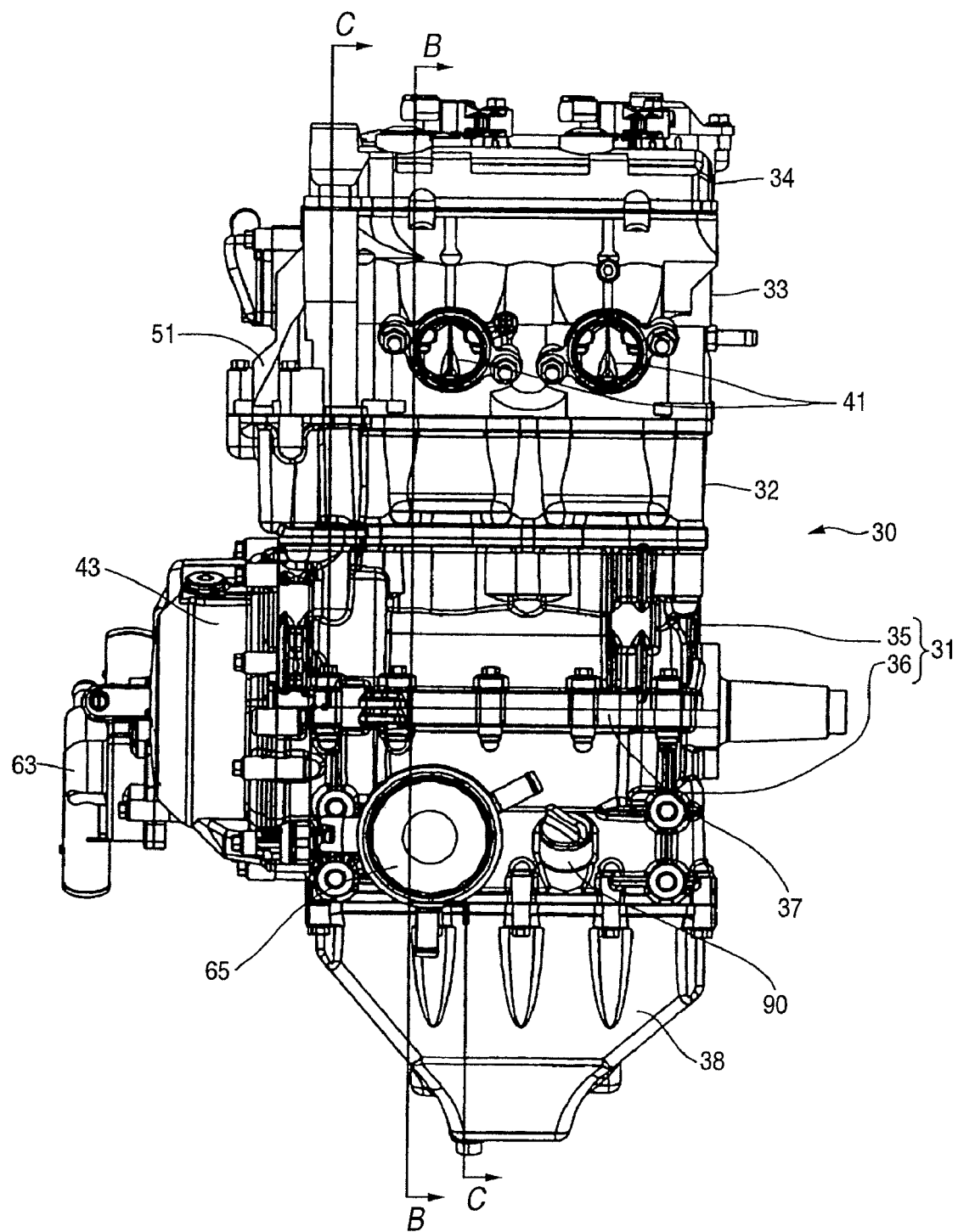
FIG. 3 is a front view showing the engine of the embodiment of the invention.
Figure 4:
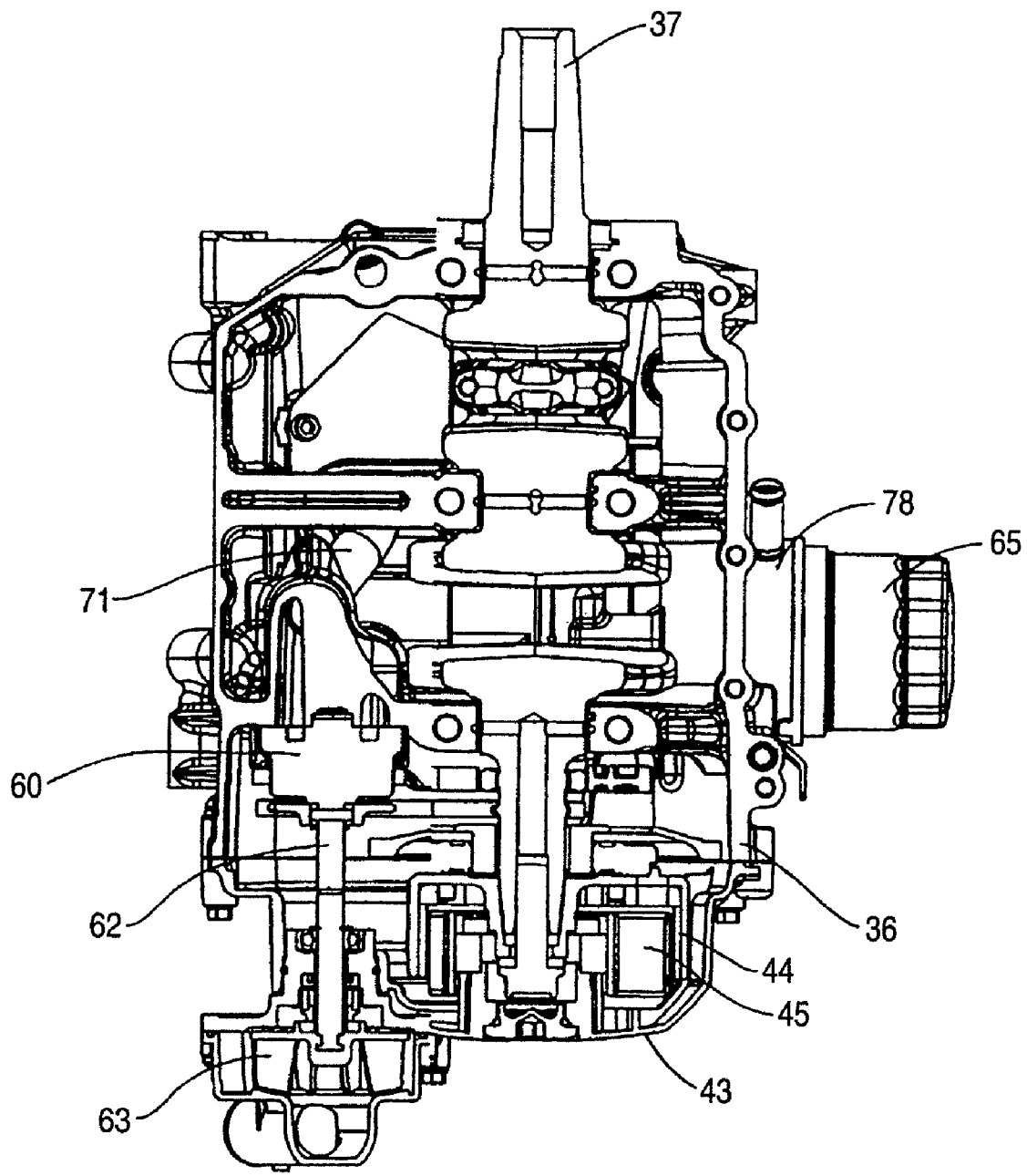
FIG. 4 is a sectional view taken along a line A-A of FIG. 2.
Figure 5:
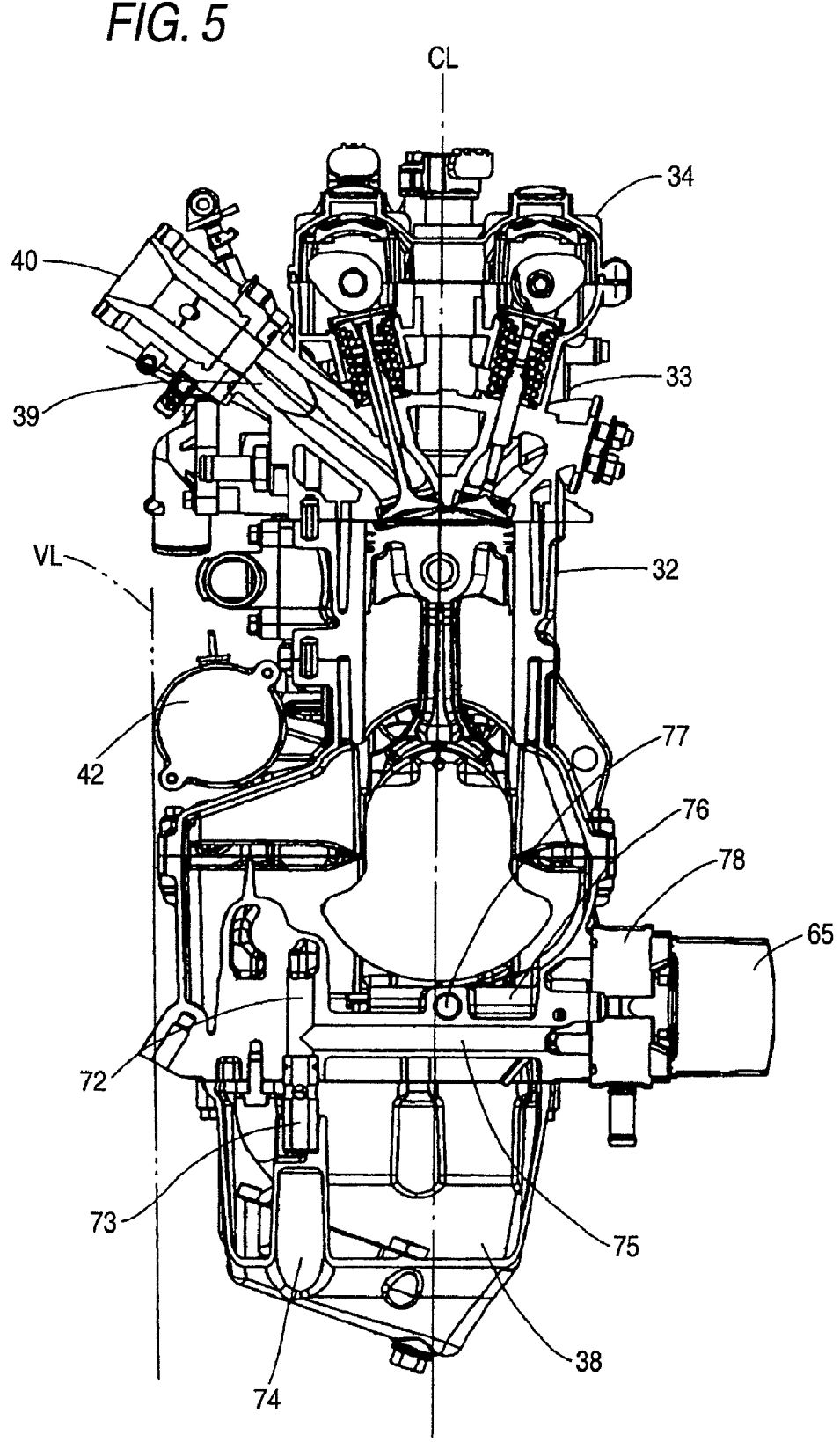
FIG. 5 is a sectional view taken along a line B-B of FIG. 3.
Figure 6:
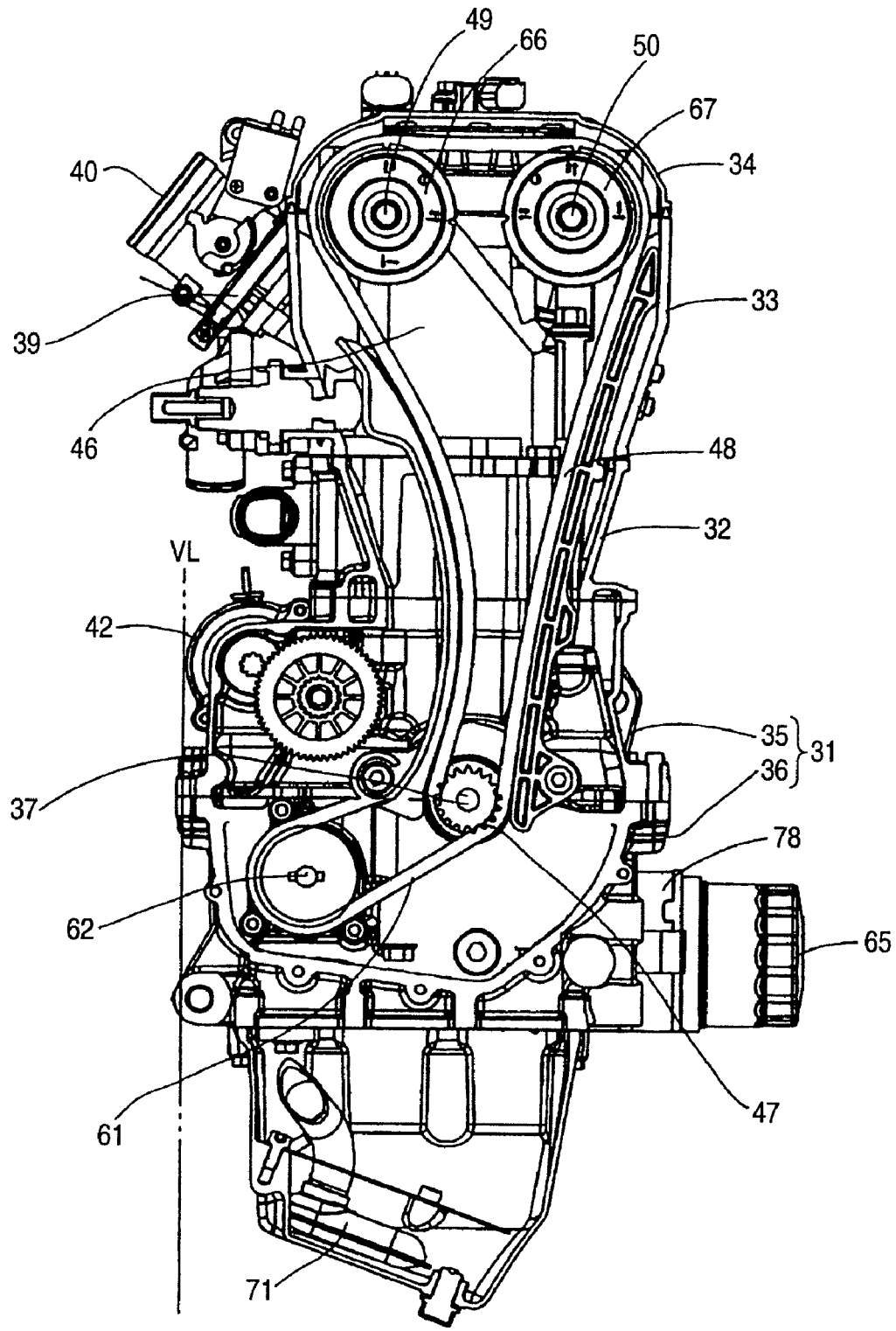
FIG. 6 is a sectional view taken along a line C-C of FIG. 3.

First, the overall configuration of a snow vehicle on which an engine according to the embodiment of the invention is mounted will be explained with reference to FIG. 1.

The snow vehicle 1 is formed with a vehicle body frame 10 that extends in a front-back direction. A pair of right and left steering sleds 12 are installed below a front part 11 of the vehicle body frame 10 so as to be rotatable in a right-left direction. Further, a driving crawler 15 is arranged below a rear part 13 of the vehicle body frame 10. The crawler 15 includes a driving wheel 16 arranged at a front end of the rear part 13 of the vehicle body frame 10, a driven wheel 17 arranged at a rear end, a plurality of intermediate wheels 18, a suspension mechanism 19, and a track belt 20 that is wound and circulated around the respective wheels.

A rear portion of the front part 11 of the vehicle body frame 10 forms a shape that rises in an obliquely rearward and upward direction, and a track housing 21 is formed continuously with the rear part 13 of the vehicle body frame 10 so as to accommodate an upper vicinity of the driving wheel 16 of the crawler 15.

The rear part 13 of the vehicle body frame 10 also serves as a cover that accommodates the whole crawler 15 therebelow, a seat 22 is arranged above the rear part 13, and steps (not shown) that become one-step lower than the seat 22 are provided on both sides of the seat 22 in a vehicle width direction.

A steering post 23 is erected in an oblique rearward upward direction from the front part 11 of the vehicle body frame 10, a steering handle 24 is provided at an upper end of the steering post 23 so as to extend in a right-left horizontal direction, and the steering sleds 12 are operated via the steering post 23 by the steering handle 24.

In the vicinity of the steering handle 24, an instrument panel 25 is provided so as to cover a rear upper portion of the front part 11 of the vehicle body frame 10, and instruments, such as a speedometer and a tachometer, are disposed in the instrument panel 25. Further, a windshield 26 is erected in both lateral directions from the front so as to surround a front outer periphery of the instrument panel 25, and an engine hood 27 is formed on the front and lateral sides of a base of the windshield 26 substantially in a streamline shape that is gently downward inclined. Moreover, in the vicinity of an apex of the engine hood 27, a headlight 28 that illuminates the front is disposed.

An engine room 29 is formed below the instrument panel 25 and the engine hood 27 that are disposed in this manner, and an engine 30 is mounted in the engine room 29.

Next, the configuration of an arrangement structure of auxiliaries of the engine of the embodiment of the invention will be explained with reference to FIG. 1 and FIGS. 2 to 6.

The engine 30 is a water-cooled 4-cycle 2-cylinder engine, and the contour thereof is mainly composed of a crank case 31, a cylinder block 32 disposed above the crank case 31, and a cylinder head 33 and a cylinder cover 34 disposed above the cylinder block 32. The engine is arranged in a substantially central portion of the front part of the vehicle body of the snow vehicle 1 in a state where its upper part is tilted rearward of the vehicle body such that an axis CL of the cylinder block 32 is inclined rearward.

The crank case 31 is configured by a split structure composed of an upper crank case 35 and a lower crank case 36, and a crank shaft 37 is supported along the vehicle width direction between the upper crank case 35 and the lower crank case 36. Further, an oil pan 38 is disposed below the lower crank case 36 in the vicinity of the bottom of the engine room 29.

An intake passage 39 and a throttle body 40 are disposed behind the cylinder head 33, and the intake passage 39 is arranged in a position higher than the cylinder head 33, and is configured by a down-draft method of blowing down the air sent to an intake port (not shown) from above. Further, an exhaust passage 41 is arranged at a front part of the cylinder head 33, and the exhaust passage 41 is connected to an exhaust muffler that is not shown. Moreover, a starter motor 42 is arranged behind the cylinder block 32 and below the intake passage 39.

The right side of the crank case 31 is covered with a magnet cover 43, a magnet chamber 44 is formed inside the crank case, and a right end of the crank shaft 37 is connected to a magnet unit 45 consist of the magnet cover 43 and the magnet chamber 44.

The cam driving mechanism chamber 46 is provided between the crank case 31 and a magnet wall 44, and on the right of the engine 30 thereabove. In the cam driving mechanism chamber, a cam-chain drive sprocket 47 is provided on the left of a magnet unit 45 at the right end of the crank shaft 37. The cam-chain drive sprocket 47 is connected to cam sprockets 66 and 67 provided at right ends of cam shafts 49 and 50 via a cam chain 48. Accordingly, the rotation of the crank shaft 37 is transmitted to the cam shafts 49 and 50, and a dynamic valve mechanism (not shown) provided within the cylinder head 33 are operated. A breather chamber 51 is provided on the right of the cam driving mechanism chamber 46 and above the magnet unit 45.

An oil pump 60 is provided behind and below the crank shaft 37. The oil pump 60 is arranged in front of an tangent line VL of the starter motor 42, which is parallel to an axis CL of the cylinder block 32, when seen from the lateral side of the engine, and is driven as the rotation of the crank shaft 37 is transmitted via an oil pump driving chain 61. Further, a suction port of the oil pump 60 is provided with an oil strainer 71, and lubricating oil reserved in the oil pan 38 is supplied to the oil pump 60 via the oil strainer 71.

A first oil passage 72 is disposed between a discharge port of the oil pump 60 and the oil pan 38. The first oil passage 72 communicates the discharge port of the oil pump 60 with the oil pan 38 in a vertical direction. An oil relief valve 73 is attached to an opening end of the first oil passage 72 on the side of the oil pan 38. Further, the oil pan 38 is formed with a positioning protruding portion 74, and the oil relief valve 73 can be installed in an optimal position by the positioning protruding portion 74. Accordingly, if the supply pressure of the lubricating oil from the oil pump 60 exceeds a predetermined pressure, the high-pressure lubricating oil is returned to the oil pan 38 via the oil relief valve 73.

In the lower crank case 36 on a front side of the crank shaft 37, an oil filter 65 protrudes forward, and an oil cooler 78 is provided behind the oil filter 65. A second oil passage 75 is provided between the oil filter 65 in the middle of the first oil passage 72. The second oil passage 75 communicates the oil filter 65 with the middle of the first oil passage 72 in a lateral direction. Further, a third oil passage 76 is formed parallel to the second oil passage 75 rearward from the oil filter 65, and a main gallery 77 is formed in a right-left direction so as to communicate with the third oil passage 76. Accordingly, the lubricating oil that has passed through the oil filter 65 is supplied to respective parts of the engine 30 through the third oil passage 76 and the main gallery 77.

In the lower crank case 36 in front of the crank shaft 37, an oil supply hole 90 is provided in parallel on the left side of the oil filter 65, and the oil supply hole 90 is blocked by a cap that serves as an oil level gauge.

A water pump 63 is arranged coaxially with a drive shaft 62 of the oil pump 60. The water pump 63 is attached to the outside of the magnet cover 43, and is adapted to supply cooling water to a water jacket (not shown) formed inside the engine 30 to cool down the engine 30. Further, a heat exchanger 64 is provided within the engine room 29 so as to face the track belt 20 above (front end of the track housing 21) the front side of the crawler 15 in the traveling direction of a vehicle, and the cooling water that has absorbed heat from the water jacket is radiated by the heat exchanger 64 through cooling water piping (not shown).

A clutch mechanism (not shown) is provided in a left portion of the engine room 29 on the left of the crank shaft 37, and the clutch mechanism is configured as a V-belt-type endless transmission in which a centrifugal clutch device is built, and is configured such that a driving force is transmitted to the track belt 20 via gears or the like on power-receiving side.

As described above, according to the embodiment of the invention, the oil filter 65 and the oil supply hole 90 are provided in front of the engine 30, and the oil pump 60 and the water pump 63 are arranged opposite to the oil filter 65 with respect to the crank shaft 37. Since no auxiliaries is disposed around the oil filter 65 and the oil supply hole 90, a maintenance space can be sufficiently secured. Accordingly, replacement work of the oil filter 65, an oil change from the oil supply hole 90 and daily checkup can be performed easily, and maintenance performance can be improved.

Further, since the oil pump 60 is provided behind and below the crank shaft 37, the position of the oil pump 60 becomes low, and the distance from the oil pan 38 becomes short. Therefore, the oil strainer 71 can be shortened. Accordingly, the suction stroke of lubricating oil becomes short. As a result, the pumping efficiency of lubricating oil can be enhanced. Therefore, an initial lubrication of the engine at the time of start of the engine is not delayed.

Moreover, the oil pump 60 is arranged in front of the tangent line VL of the starter motor 42, which is parallel to the axis CL of the cylinder block 32. As a result, the oil pump 60 does not protrude rearward. For this reason, it is possible to make the engine 30 compact. Further, since the engine 30 can be arranged in the vicinity of the track housing 21, and the handling of the snow vehicle can be improved.

Furthermore, the water pump 63 is arranged coaxially with the drive shaft 62 of the oil pump 60. As a result, the distance between the water pump 63 and the heat exchanger 64 becomes short, and the length of the cooling water piping becomes short. For this reason, reduction in size and weight of the engine can be achieved, and cooling efficiency can be improved.

Moreover, the oil relief valve 73 is arranged at the opening end of the first oil passage 72 on the side of the oil pan 38. Therefore, it is not necessary to separately provide a place where the oil relief valve 73 is to be attached. Accordingly, manufacturing of the oil passages can be simplified, and it is possible to make the engine compact. Further, since the surplus oil from the oil pump 60 is directly returned to the oil pan 38, generation of the bubbles caused by dropping the oil in an oil passage can be prevented, and the surplus oil can be surely returned to the oil pump 60.

Further, in the above embodiment, the arrangement structure is applied to the engine of the snow vehicle. However, the invention is not limited to this case. For example, it is natural that the invention can be applied to engines of vehicles, such as two-wheeled motor cycles and ATVs (All Terrain Vehicles), other than the snow vehicle.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An arrangement structure of auxiliaries of an engine for a snow vehicle, the engine having a crank shaft supported by a crank case along a width direction of the snow vehicle, an oil pan disposed below the crank case, and a cylinder block disposed above the crank case, and the engine mounted on the snow vehicle such that an axis of the cylinder block is inclined rearward,
   wherein an oil pump is disposed behind and below the crank shaft;
   wherein an oil filter is disposed in front of the crank shaft; and
   wherein the oil pump is disposed at one side with respect to the axis of the cylinder block in a side view of the snow vehicle and the oil filter is disposed at the other side with respect to the axis of the cylinder block.

2. The arrangement structure as set forth in claim 1,
   wherein a starter motor is provided behind the cylinder block; and
   wherein the oil pump is disposed in front of a tangent line of the starter motor, which is parallel to the axis of the cylinder block, when seen from the lateral side of the engine.

3. The arrangement structure as set forth in claim 1,
   wherein a first oil passage is provided to communicate a discharge port of the oil pump with the oil pan;
   wherein a second oil passage is provided to communicate the oil filter with the middle of the first oil passage; and
   wherein an oil relief valve is provided at an opening end of the first oil passage on the side of the oil pan.

4. The arrangement structure as set forth in claim 1,
wherein a V-belt-type endless transmission is mounted on one side portion of the engine in the width direction of the snow vehicle and a magnet unit is mounted on the other side portion of the engine, and
wherein the oil pump is disposed at the one side portion of the engine.

5. The arrangement structure as set forth in claim 4,
wherein a water pump is disposed coaxially with a drive shaft of the oil pump, and the drive shaft of the oil pump is offset from an outer peripheral line of the magnet unit in the side view of the snow vehicle, and
wherein the drive shaft of the oil pump extends across the magnet unit in the width direction of the snow vehicle such that the magnet unit is disposed between the oil pump and the oil filter.

6. An engine which is configured to be mounted on a vehicle, the engine comprising:
a crank shaft extending in the width direction of the vehicle;
a crank case supporting the crank shaft;
a cylinder block disposed above the crank case;
an oil pan disposed below the crank case;
an oil pump disposed behind and below the crank shaft;
an oil filter disposed in front of the crank shaft;
wherein the engine is mounted on the vehicle such that an axis of the cylinder block is inclined rearward, and
wherein the oil pump is disposed at one side with respect to the axis of the cylinder block in a side view of the vehicle and the oil filter is disposed at the other side with respect to the axis of the cylinder block.

7. The engine as set forth in claim 6,
wherein a V-belt-type endless transmission is mounted on one side portion of the engine in the width direction of the vehicle and a magnet unit is mounted on the other side portion of the engine, and
wherein the oil pump is disposed at the one side portion of the engine.

8. The engine as set forth in claim 7,
wherein a water pump is disposed coaxially with a drive shaft of the oil pump, and the drive shaft of the oil pump is offset from an outer peripheral line of the magnet unit in the side view of the vehicle, and
wherein the drive shaft of the oil pump extends across the magnet unit in the width direction of the vehicle such that the magnet unit is disposed between the oil pump and the oil filter.

* * * * *